Oct. 30, 1962 KUNIMORI MARUYAMA 3,061,362
VACUUM-ACTUATED, REMOTE CONTROL APPARATUS FOR
OPENING AND CLOSING MOTOR VEHICLE DOORS
Filed Sept. 11, 1959 5 Sheets-Sheet 1

Inventor
K. Maruyama
Attys

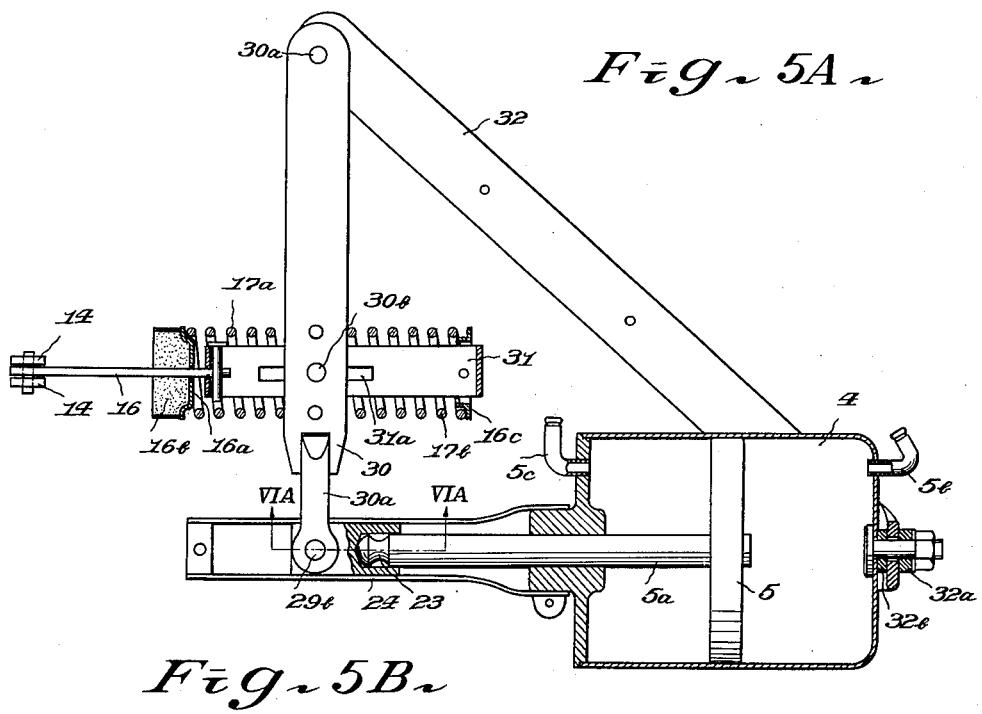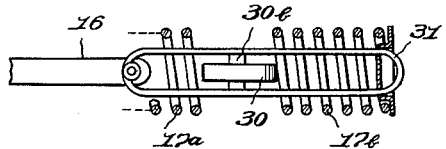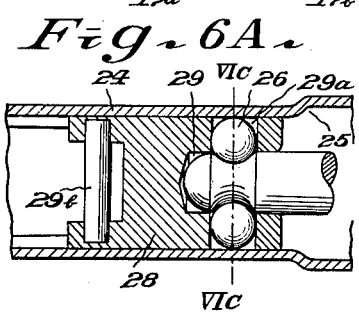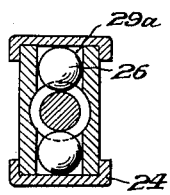

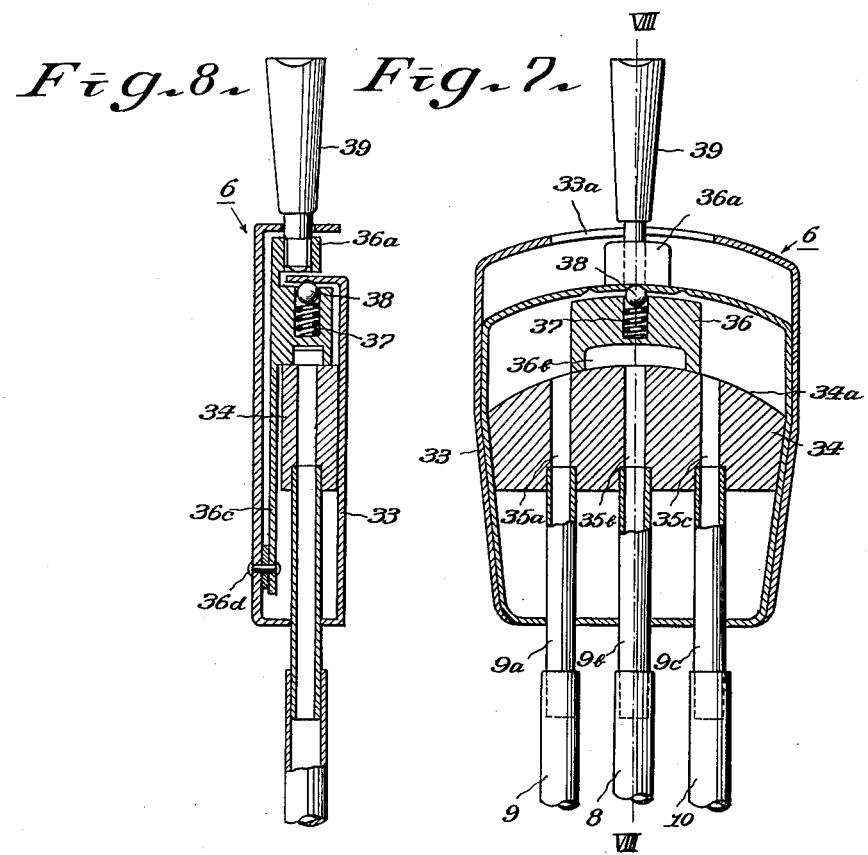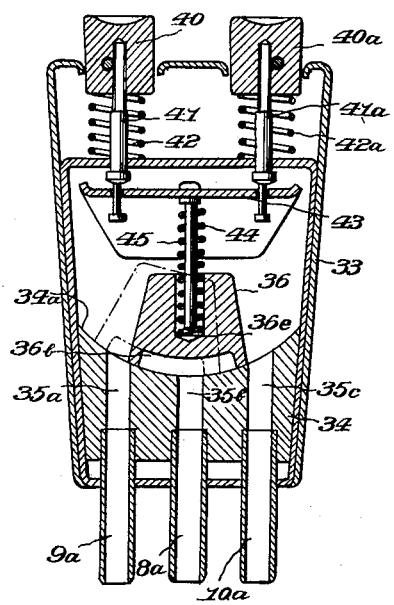

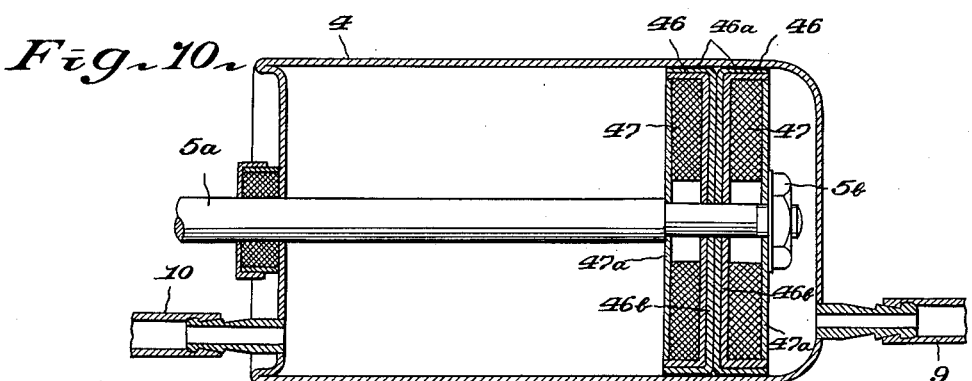
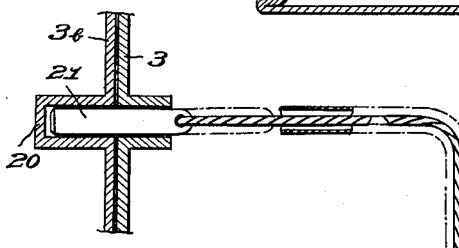
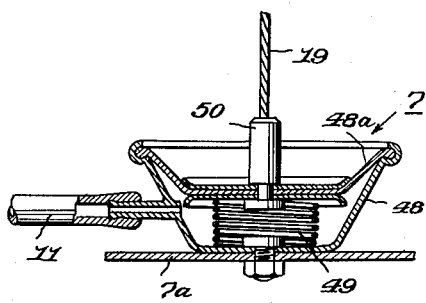
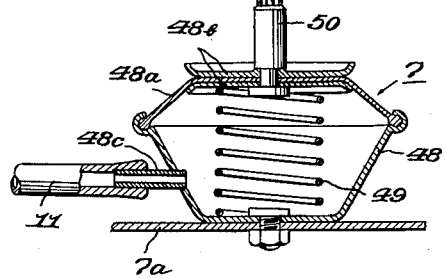

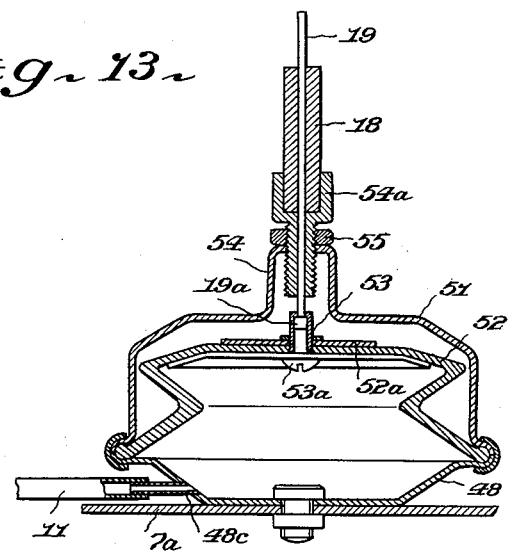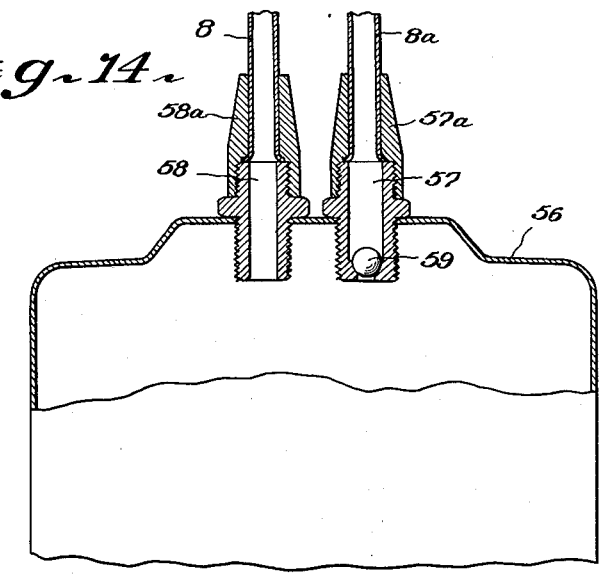

United States Patent Office 3,061,362
Patented Oct. 30, 1962

3,061,362
VACUUM-ACTUATED, REMOTE CONTROL APPARATUS FOR OPENING AND CLOSING MOTOR VEHICLE DOORS
Kunimori Maruyama, Asahi-machi, Kawasaki-shi, Japan, assignor to Minoru Okada, Tokyo-to, Japan
Filed Sept. 11, 1959, Ser. No. 839,357
Claims priority, application Japan Nov. 1, 1958
3 Claims. (Cl. 296—44)

The present invention relates to a new and useful apparatus for opening and closing by remote control one or more than one door of a motor car.

An essential object of this invention is to provide, in a manner as hereinafter set forth, an apparatus which is adapted to be easily attached to one or more than one door of a motor car and which can open and close by remote control said door in a rapid and positive manner with a strong force.

Another object of the present invention is to provide an apparatus which is adapted to open and close one or more than one door of a motor car by means of simple operation of a shiftable handle or a push button device.

Still another object of the present invention is to provide an apparatus which is adapted to check the movement of a door of a motor car so that said door cannot be opened or closed by any passenger, thus ensuring safety of the passengers.

A further object of the present invention is to provide an apparatus which is adapted to make the opening movement of the door of a motor car very slow at the end of said movement, and to make the closing movement of said door forcible at the end of said movement.

A still further object of the present invention is to provide an apparatus capable of carrying out effectively the operation of a door for several times even after the motor car engine has been stopped.

Another important object of the present invention is to provide an apparatus which is adapted to be easily stopped for enabling manual operation of a door of a motor car.

While the novel features which are believed to be characteristic of the present invention are set forth with particularity in the appended claims, the present invention itself, however, both as to its operation and construction, together with further objects and advantages thereof, may best be understood by reference to the following description taken in connection with the accompanying drawings, wherein the same numerals and letters refer to the same or similar parts throughout, and in which:

FIG. 5A is a side view of an improved linkage mechanism for turning a door of a motor vehicle, said mechanism being constructed in accordance with the present invention;

FIG. 5B is a plan view of the holder of the linkage mechanism of FIG. 5A;

FIG. 6A is a plan view, in section, taken along the line VIA—VIA in FIG. 5A, showing the position in its free position;

FIG. 6B is the same view as FIG. 6A, but showing the position in engaged position;

FIG. 6C is a sectional view taken along the line VIC—VIC in FIG. 6A;

FIG. 7 is a front view, vertically sectioned, of a manual switch constructed in accordance with the present invention;

FIG. 8 is a side view of the manual switch illustrated in FIG. 7, taken along the line VIII—VIII in FIG. 7.

FIG. 9 is a front view, vertically in section, of another manual switch constructed in accordance with the present invention;

FIG. 10 is a side view of another cylinder, vertically in section, constructed in accordance with the present invention;

FIG. 11 is a side view, vertically in section, of a contractable case constructed in accordance with the present invention, showing said case in expanded position;

FIG. 12 is the same view as FIG. 11, but showing said case in contracted position;

FIG. 13 is a side view, vertically in section, of another contractable case constructed in accordance with the present invention;

FIG. 14 is a side view of a vacuum tank to be used in the apparatus of the present invention.

Figure 1:
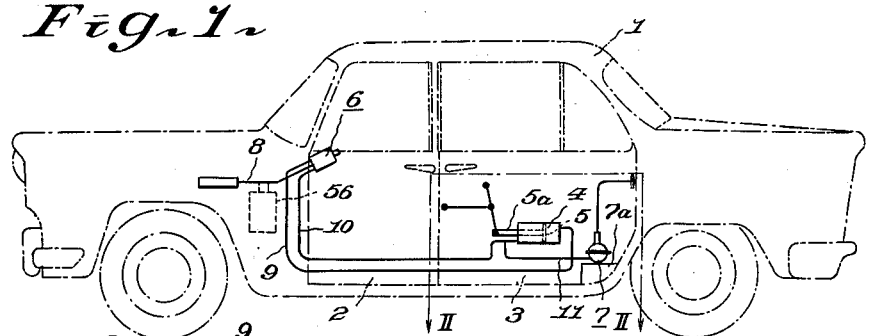
FIG. 1 is a schematic side view of a motor car to which the aparatus of the present invention is installed.

Referring to FIGS. 1–4, the apparatus of the present invention comprises a cylinder 4 installed in the interior of the door 3 of a motor car 1, a contractable case 7 supported by a supporting plate 7a attached to the lower interior of said door 3, and a manual switch 6 mounted in the driver's compartment, said cylinder, manual switch, and contractable case being, respectively, shown in detail in FIGS. 5 and 10, 7–9, and 11–13. The cylinder 4 comprises a piston 5 having a piston rod 5a and a lug piece 4a whereby the cylinder is mounted to a wall of the door 3 by means of screws. As shown in FIG. 10, the piston 5 can be composed of cup-shaped metal plates 46 which are attached to each other back-to-back and provided with a leather layer 46a attached to their outer peripheries, dish-shaped washer plates 46b which are inserted in said metal plates 46 so as to push said plates 46 at their peripheral walls, felt blocks 47 which are, respectively, disposed in said washer plates 46b, outer metal plates 47a which are, respectively, placed on said felt blocks 47, and a screw nut 5b adapted to tightly attach the abovementioned members to the piston rod 5a. The cylinder 4 and its piston 5 are preferably constructed to have circular section, but they may have elliptical section when the door is thin as in the case of small motor cars.

As shown in FIGS. 7 and 8, the manual switch 6 is composed, for example, of a metal casing 33 formed by bending a metal plate, a block member 34 attached to said casing, said block member having a convex arcuate upper surface 34a and three holes 35a, 35b and 35c formed therethrough, connection pipes 9a, 9b and 9c which are, respectively, airtightly connected to the pipes 9, 8 and 10, a slidable valve member 36 adapted to slide airtightly along the arcuate surface 34a and having an extended arm 36C which extends downward along the rear surface of the block member 34 and is pivoted at its lower end to the casing 33 by a pivotal shaft 36d and having a head block 36a, said slidable valve member 36 being provided with a concave space 36b thereunder and a hole in which a ball 38 is inserted to be pushed upward by means of a spring 37 placed in said hole, and a handle 39 which is engaged with a hole of the head block 36a and extends upward through an elongated slot opening 33a in the outer peripheral wall of the casing 33.

Referring to the manual switch illustrated in FIGS. 7 and 8, when the handle 39 takes the center position as shown in said drawings, both holes 35a and 35c are communicated with the atmosphere through the spaces between the casing 33 and the valve member 36 and only the hole 35b is airtightly communicated with the concave space 36b. However, when the handle 39 is shifted leftward from the position shown in FIG. 7, the holes 35a and 35b are communicated with each other by the concave space 36b. Similarly, the holes 35b and 35c can be communicated with each other through the concave space 36b by suitable rightward shifting of the handle 39.

FIG. 9 shows an improved push button type manual switch which is composed of a metal casing 33 such as described in connection with the manual switch in FIGS. 7 and 8, a block 34 attached to said casing, said block having a concave arcuate upper surface 34a and three holes 35a, 35b, and 35c formed therethrough, connection pipes 9a, 8a, and 10a corresponding to the pipes 9a, 9b and 9c, as shown in FIG. 7, a slidable valve member 36 adapted to slide airtightly along the arcuate surface 34a and having a concave space 36b thereunder and a cavity 36e, push buttons 40 and 40a which are supported by the upper wall of the casing 33 to be movable up and down and are provided, respectively, with button rods 41 and 41a, springs 42 and 42a wound around said rods at the position between the push buttons 40, 40a and an intermediate partition of the casing 33, a dished plate 43 engaged with the lower ends of the button rods 41 and 41a, and an extension pin 44 which is fixed at its upper end to the center portion of said plate 43 and is engaged at its lower portion in said cavity 36e through a spiral spring 45 wound therearound.

Referring to the manual switch illustrated in FIG. 9, when the push button 40a is pushed downward, the dished plate 43 is inclined and the slidable valve member 36 is shifted leftward as shown by broken line, whereby the holes 35a and 35b are communicated with each other through the concave space 36b. When the push button 40a is released, the shiftable block 36 is restored to the position as shown in the drawing.

Similarly, the holes 35b and 35c can be communicated with each other through the concave space 36b by the downward pushing of the push button 40.

Figure 2:
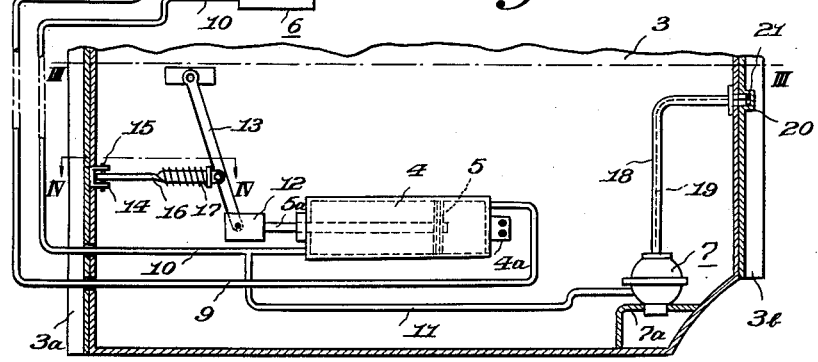
FIG. 2 is a schematic enlarged side view of an apparatus of the present invention, vertically in section, substantially along the line II—II of FIG. 1.

As shown in FIG. 11, the contractable case 7 is composed of a cup-shaped metal casing 48, a rubber cover 48a supported airtightly at its periphery by the periphery of said metal casing 48, a pin 50 attached airtightly to said rubber cover 48a by means of washer plate 48b and a nut, a spring 49 inserted between said washer plates and the bottom of said casing 48, and a connection pipe 48c attached to the casing 48, said contractable case 7 being supported by the supporting plate 7a as clearly shown in FIGS. 1 and 2, and said pin 50 being provided with a flexible wire 19 which in turn is passed through a hollow pipe 18. The end of the flexible wire 19 is connected to a lock piece 21 which is slidably placed, through a hole of the door 3, in a recess 20 formed in the member 3b of the car body.

When the contractable case 48 contains air therein, it is in the state as shown in FIG. 11. However, if the air in the case 7 is sucked through a pipe 11 attached to the connection pipe 48c, the rubber cover 48a will be drawn downward as shown in FIG. 12, whereby the flexible wire 19 is pulled and the lock piece 21 is retracted from the lock recess 20, thus enabling unlocking between the member 3b and the door 3. Then, when air is fed into the contractable case 48 through the pipe 11, the rubber cover 48a is restored to the state as shown in FIG. 11, whereby the flexible wire 19 is released and the lock piece 21 is locked again in the recess 20.

FIG. 13 shows an improved contractable case 7 which is composed of a cup-shaped metal casing 48 supported by the supporting plate 7a and provided with the same connection pipe 48c connected to the pipe 11 as that of the embodiment in FIG. 11, a bellows-shaped rubber cover 52 which is airtightly engaged at its periphery with the periphery of said casing 48, and a metal cover 51 provided with a hollow head portion 54. A hollow pin 53 is airtightly attached through washer plates 52a to the center top of the rubber cover 52 by means of a screw 53a. A flexible wire 19 is engaged at its lower end 19a in the pin 53, said wire extending outward through a socket 54a screwed in said hollow head portion 54 of the metal cover 51 and through a hollow pipe 18 engaged in said socket 54a. The longitudinal position of the socket 54a can be adjusted by a nut 55.

The functioning of the embodiment of FIG. 13 is the same as that of the embodiment of FIG. 11. Accordingly, detailed description of the functioning of the embodiment of FIG. 13 is omitted herein.

In the above-mentioned embodiments; the leftside and rightside chambers of the cylinder 4 are, respectively, communicated with the rightside hole 35c and leftside hole 35a of the manual switch 6 by means of the pipes 10 and 9, and the center-hole 35b of the manual switch 6 is communicated with the air suction pipe of the motor vehicle engine by means of the pipe 8. Said suction pipe and motor vehicle engine are not shown in the drawings because they are well-known. The interior of the casing 48 of the contractable case 7 is communicated with the pipe 10 by means of a pipe 11; the free end of the piston rod 5a of the piston 5 in the cylinder 4 is provided with a joint piece 12 attached thereto and to this piece is pivotally connected a free end of a linkage lever 13 the other end of which is pivotally connected to the wall of the door 3, an intermediate portion of said linkage lever being pivoted to sheath plates 17 which are slidably engaged with a stopper 16. The plates 17 are provided with a spring 17a wound therearound, the leftside end of said spring being engaged with leftside ends of said plates and the rightside end of said spring being fixed to the stopper 16. The stopper 16 is pivotally supported by lugs 14 projected from the stationary member 3a of the vehicle body through an opening of the wall of the door 3.

Operation of the above-mentioned embodiments will be described in the following disclosure in connection with FIGS. 1–4, and 7–13.

When the handle 39 (FIG. 7) is shifted rightwardly or the push button 40 (FIG. 9) is pushed so as to communicate the holes 35b and 35c with each other, the rightside chamber of the cylinder 4 is communicated with the atmosphere through the pipe 9 and the leftside chamber of said cylinder is communicated with the air suction pipe of the motor vehicle engine through the pipes 8 and 10, whereby the piston 5 is drawn leftward to make the piston rod 5a extend out of the cylinder 4.

Figure 3:
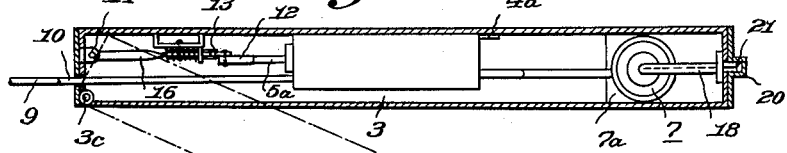
FIG. 3 is a sectional plan view of the door, taken substantially along the line III—III of FIG. 2.

On the other hand, the air in the contractable case 7 is sucked through the pipe 11, and the rubber cover 48a (FIG. 11) or 52 (FIG. 13) of said case is drawn together with the pin 50 (FIG. 11) or 53 (FIG. 13), whereby the flexible wire 18 is drawn and the lock piece 21 is removed from the recess 20. Accordingly, upon removal of the lock piece 21 from the recess 20, the door 3 is turned around the pivotal shaft 3C (FIG. 3) by the extension force of the piston rod 5a to the opened state such as shown in FIG. 3 by broken line. In this opening operation, the opening movement is smooth and is very slow at the end of said movement because of existence of the buffering stop mechanism consisting of stopper 16, sheath plate 17 which is slidably inserted on said stopper, and the spring 17a.

Next, when the handle 39 is shifted leftward or the push button 40a is pushed so as to communicate the holes 35b and 35a with each other, the leftside chamber of the cylinder 4 is communicated with atmosphere through the pipe 10 and the rightside chamber of said cylinder is communicated with the air suction pipe of the motor vehicle engine through the pipes 8 and 9, whereby the piston 5 is drawn rightward to pull the piston rod 5a into the cylinder. On the other hand, upon said operation of the handle 39 the interior of the contractable case 7 is communicated with atmosphere through the pipes 11 and 10 and the rubber cover 48a (FIG. 11) or 52 (FIG.

13) of said case expands, whereby the flexible wire 19 is pushed outward. In this case, however, operation of the piston is very rapid because of forcible attraction of said piston due to sucking action, and said expansion of said rubber cover is slow, because air enters into the case 7 from the atmosphere through the gap of the manual switch without accepting any external force. Accordingly, the lock piece 21 extends into the recess 20 after complete closing of the door. Even when the lock piece 21 extends somewhat before complete closing of the door, the lock piece 21 is somewhat retracted by the closing force of the door because said piece is attached to the end of the flexible wire and this wire is connected to the flexible rubber cover so that said piece can enter into the recess 20 upon the complete closing of the door. If, however, a conventional movable keeper is mounted on the door jamb, the returning lock piece or bolt 21 merely displaces the keeper as it moves into the recess 20, and the timing of bolt 20 is of less importance.

As described above, the door 3 can be remotely controlled to open and close and cannot be opened by any passenger, thus ensuring safety of the passengers.

Figure 4:
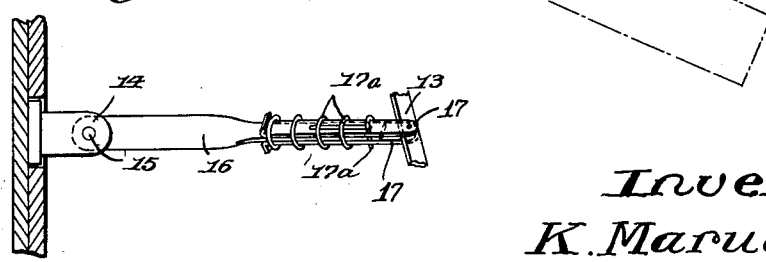
FIG. 4 is an enlarged plan view of the buffer stopper, taken along the line IV—IV of FIG. 2.

The linkage mechanism as illustrated in FIGS. 2, 3 and 4 can be improved as shown in FIGS. 5A, 5B, 6A, 6B and 6C, in which the cylinder 4 having a piston 5 and connection fittings 5b and 5c is rigidly fixed to a fixing plate 32 at its one end by screw nuts 32a and 32b, said plate being fixed to the door in the interior thereof. The piston rod 5a is provided at its head portion with a circular concave slot 23. The linkage mechanism is composed of a sheath member 24 attached to the cylinder 4 so as to make the piston rod 5a slidably protrude therein and provided with an expanded shoulder portion 25, a slidable block member 28 which is slidably engaged in said sheath, said block member 28 being provided with a lateral pin 29b, a lateral hole 29a and a longitudinal hole 29 into which the piston rod 5a can engage, balls 26 engaged in said hole 29a, a lever 30 which is pivoted at its one end to the fixing plate 32 and pivoted at another end to said pin 29b through a link piece 30a, a flat ring-shaped holder 31 the leftside end of which is connected to a stopper 16 pivoted at its leftside end to the lugs 14 such as having been described in connection with FIG. 2, a rubber block 16b attached to said stopper 16, a cup-shaped member 16a attached to said block 16b, a cup-shaped member 16c fixed to said holder 31, and springs 17a and 17b, said lever 30 being provided with a pin 30b which is engaged with an elongated slot 31a of the holder 31.

In the embodiment of FIGS. 5A, 5B, 6A, 6B and 6C, when the connection fitting 5C is communicated with the air suction pipe of the motor vehicle engine and the fitting 5b is communicated with the atmosphere by control of the manual switch, the piston 5 is attracted leftward and the head of the piston rod 5a protrudes into the hole 29 of the block member 28 and engages with the balls 26 as shown in FIG. 6A, whereby the block member 28 is slid leftward and the stopper 16 is pushed toward the lugs 14 through the lever 30 and the spring 17a, thus ensuring the opening function of the door as in the case of the embodiment illustrated in FIGS. 2 and 3. On the contrary, if the piston 5 is attracted rightward by reverse communication of the connection fittings 5c and 5b, the block member 28 is slid rightward and one stopper 16 is attracted rightward through the lever 30 and the spring 17b, whereby the door is closed.

At the end of said closing movement, the piston rod 5a is detached from the balls 26 and brought in the position as shown in FIG. 6B, so that the block member 28 becomes free, enabling free and light manual operation of the door without relation to the existence of the apparatus of the present invention.

In the above-mentioned embodiments, there may be an apprehension that when the motor vehicle engine stops, air suction cannot be attained, thus stopping the door operating action. Such a disadvantage can be eliminated by providing a vacuum tank 56 as shown in FIG. 14 at the intermediate position of the pipe 8 as shown in FIG. 1 by broken line. The tank 56 is provided with two connection fittings 58 and 57 which are airtightly screwed in the upper wall of said tank, the fitting 57 being communicated with the air suction pipe of the motor vehicle engine by a pipe 8a and the fitting 58 being communicated with the center connection pipe 8 of the manual switch 6 by a pipe 8, said pipes 8 and 8a being, respectively, fixed to the fittings 58 and 57 by means of screw caps 58a and 57a screwed with said fittings 58 and 57. The fitting 57 is provided with a nonreversible check valve 59. When the vacuum tank 56 is provided, the door operating function can be carried out several times even after the motor vehicle engine stops.

In the above-mentioned embodiments, door locking is achieved by a lock piece which is connected to one end of a flexible wire and is so arranged that said piece can be inserted into or retracted from a recess in a stationary member of the vehicle body through the door by means of the flexible wire. However, any one of the conventional lock devices may be operated by means of said flexible wire so that when the flexible wire is pulled the lock device is released, thus releasing the door into the state to be opened.

Furthermore, the above-mentioned embodiments relate to the apparatus in which the cylinder is fixed to the door, the piston rod of said cylinder is pivotally connected to the stationary part of the car body through a linkage, and the relative motion of the piston rod with respect to the cylinder is utilized for operating the door. However, the present invention may be embodied by fixing the piston rod to the door and by pivotally connecting the cylinder to the stationary part of the vehicle body by means of a linkage mechanism so as to obtain a relative motion between the cylinder and piston.

The foregoing is considered as illustrative only of the principle of the invention. Further, since numerous modifications and changes will readily occur to one skilled in the art, it is not desired to limit the invention to the construction and operation shown and described, and accordingly, all suitable modifications and changes may be resorted to, falling within the scope of the invention as claimed.

What I claim is:

1. In an apparatus for opening and closing a door on a vehicle, a cylinder, a piston slidably mounted in said cylinder dividing said cylinder into two compartments, manual valve means to selectively apply suction at one or other end of said cylinder to cause movement of said piston therein, a piston rod connected to said piston and slidably extending through one end of said cylinder, a lever pivoted at one end in fixed relation to said cylinder and pivotally connected at its other end to an element movable by said piston rod in a direction generally tangential to the arc of motion of said other end of said lever, said means including means to automatically disengage said piston rod from said element upon movement of said piston rod to its further position in one direction, whereby said apparatus is rendered temporarily inoperative to permit manual operation of said door, a stopper means in the form of a link mounted on said lever generally parallel to said piston rod and secured to lugs adapted to receive the thrust or pull of said stopper means for opening and closing a door, and a resilient mounting between said lever and said stopper to act as a buffer to apply the thrust or pull of the piston rod resiliently to said stopper, a contractable case attached to the door, a single conduit connecting the interior of said case with said manual valve so as to apply suction when said door is to be opened and to be vented to atmosphere when the door is to be closed by operation of said manual valve, and a flexible wire attached to the movable portion of said contractable case, a bolt for the door, the free end of said flexible wire being connected to said bolt so that the door is released from closed state when said flexible wire is pulled by said contractable case and the door may be held in its closed state when said flexible wire is pushed by said contractable case upon venting said contractable case upon closing said door.

2. In an apparatus for opening and closing a door on a vehicle, a cylinder, a piston slidably mounted in said cylinder dividing said cylinder into two compartments, manual valve means to selectively apply suction at one or other end of said cylinder to cause movement of said piston therein, said manual valve consisting of a casing, a block member attached to the interior of said casing, said block member having an arcuate surface and first, second and third holes formed therethrough, said first hole being communicated with the air suction pipe of a motor vehicle engine and said second and third holes being connected one with each sides of the cylinder, a slidable valve member adapted to slide airtightly along said arcuate surface and having a concave space which can airtightly communicate said first hole with the second hole of said block member in one position of said slidable valve member and can communicate said first hole with the third hole of said block member in another position of said valve member, two push button members supported by said casing, each of said members having a rod, and a member which is connected at its center position to said slidable valve member and connected at both sides to said rods, a piston rod connected to said piston and slidably extending through one end of said cylinder, a lever pivoted at one end in fixed relation to said cylinder and pivotally connected at its other end to an element movable by said piston rod in a direction generally tangential to the arc of motion of said other end of said lever, a stopper means in the form of a link mounted on said lever generally parallel to said piston rod and secured to lugs adapted to receive the thrust or pull of said stopper means for opening and closing a door, and a resilient mounting between said lever and said stopper to act as a buffer to apply the thrust or pull of the piston rod resiliently to said stopper, a contractable case attached to the door, a single conduit connecting the interior of said case with said manual valve so as to apply suction when said door is to be opened and to be vented to atmosphere when the door is to be closed by operation of said manual valve, and a flexible wire attached to the movable portion of said contractable case, a bolt for the door, the free end of said flexible wire being connected to said bolt so that the door is released from closed state when said flexible wire is pulled by said contractable case and the door may be held in its closed state when said flexible wire is pushed by said contractable case upon venting said contractable case upon closing said door.

3. In an apparatus for opening and closing a door on a vehicle, a cylinder, a piston slidably mounted in said cylinder dividing said cylinder into two compartments, manual valve means to selectively apply suction at one or other end of said cylinder to cause movement of said piston therein, a piston rod connected to said piston and slidably extending through one end of said cylinder, a lever pivoted at one end in fixed relation to said cylinder and pivotally connected at its other end to an element movable by said piston rod in a direction generally tangential to the arc of motion of said other end of said lever, a stopper means in the form of a link mounted on said lever generally parallel to said piston rod and secured to lugs adapted to receive the thrust or pull of said stopper means for opening and closing a door, and a resilient mounting between said lever and said stopper to act as a buffer to apply the thrust or pull of the piston rod resiliently to said stopper, a contractable case attached to the door, a single conduit connecting the interior of said case with said manual valve so as to apply suction when said door is to be opened and to be vented to atmosphere when the door is to be closed by operation of said manual valve, and a flexible wire attached to the movable portion of said contractable case, a bolt for the door, said contractable case consisting of a cup-shaped casing, the interior of which is made to communicate with the air suction pipe of the motor vehicle engine or to atmosphere by means of the manual valve when the door is to be opened or closed, respectively, a bellows-shaped rubber cover supported airtightly at its periphery by the periphery of said casing providing the movable portion of said contractable case and a hard cover covering said rubber cover, said hard cover being provided with a hollow head portion through which said flexible wire passes, the free end of said flexible wire being connected to said bolt so that the door is released from closed state when said flexible wire is pulled by said contractable case and the door may be held in its closed state when said flexible wire is pushed by said contractable case upon venting said contractable case upon closing said door.

References Cited in the file of this patent
UNITED STATES PATENTS

| | | |
|---|---|---|
| 1,555,174 | Williams | Sept. 29, 1925 |
| 1,832,618 | Conklin | Nov. 17, 1931 |
| 1,991,611 | Gano | Feb. 19, 1935 |
| 2,274,668 | Crawford | Mar. 3, 1942 |
| 2,628,091 | Rappl | Feb. 10, 1953 |
| 2,726,893 | Zucker | Dec. 13, 1955 |
| 2,733,918 | Fischer | Feb. 7, 1956 |